UNITED STATES PATENT OFFICE.

SIDNEY RADCLIFF, OF BAIRNSDALE, VICTORIA, AUSTRALIA.

PROCESS OF TREATING COMPLEX RADIUM ORES.

1,049,145. Specification of Letters Patent. Patented Dec. 31, 1912.

No Drawing. Application filed April 8, 1911. Serial No. 619,862.

*To all whom it may concern:*

Be it known that I, SIDNEY RADCLIFF, a subject of the King of Great Britain, residing at Bairnsdale, in the State of Victoria, Australia, director of School of Mines, have invented an Improved Process of Treating Complex Radium Ores, of which the following is a specification.

This invention relates to the economic commercial treatment of complex radium ores for the separate recovery as marketable products of the following:—(a) Radium, as radium and barium sulfates. (b) Uranium, as oxid or uranate. (c) The "acid earths," such as tantalum, niobium, titanium, as oxids. (d) The "rare earths," such as cerium, thorium, lanthanum, didymium, etc., as oxids.

According to this invention, the crushed ore or concentrates is fused with acid sodium sulfate and a re-agent added to the fused mass, capable of bringing about a powerful, decomposing and oxidizing action. The fused mass is cooled and pulverized, and thoroughly lixiviated and agitated with water, which dissolves certain constituents and carries off from the coarse residues, sulfates of radium and barium, etc., in suspension; the turbid liquid being led to settlers and the suspended and dissolved matter treated as hereafter described for the recovery of the valuable constituents. In this manner the quantity of material to undergo the ordinary carbonate of soda treatment is greatly reduced, thereby considerably lessening the cost of treatment.

Having thus generally outlined the process I will proceed to describe a satisfactory method of carrying same out, it being understood that the details and proportions stated are merely by way of example, and will vary according to the constituents and character of the material under treatment.

The operations are as follows:—

1. The crushing of the ore or concentrates to pass a 30–40 mesh sieve.

2. The fusion of the ore in a reverberatory or other suitable furnace with about two and one half times its weight of acid sodium sulfate. When the charge has been fused, and while the mass is still fluid, sodium chlorid to the extent of from 10 to 15% of the weight of the ore is added and well rabbled in. The addition of the sodium chlorid and its reaction with or in the presence of the fused acid sodium sulfate brings about a powerful decomposing and oxidizing effect, and raises any ferrous sulfate to ferric sulfate. A more complete decomposition of the ore is also obtained, and the mass rendered more liquid. Although sodium chlorid is a cheap and very efficient reagent for the purposes mentioned, it will be apparent that other substances which bring about a similar result such, for instance, as potassium chlorate, sodium nitrate, or the like may be employed.

3. The fused product is tapped from the furnace in the liquid state, cooled and reduced to a sufficiently fine state of division. The powder is charged into suitable agitating vats containing warm water and agitated for some time. This causes most of the uranium, iron, and "rare earths," together with part of the titanium, niobium, and tantalum, to go into solution. The radium is in the insoluble state as sulfate, but remains in suspension along with the sulfates of lime, lead, and barium, and fine particles of gangue material.

4. This turbid liquid (the agitator being kept in motion), is rapidly siphoned off into suitable settlers. The coarse residues which remain in the bottom of the vat are washed by several additions of warm water and then rejected, the washings being passed into the settlers.

5. From the settlers, two products (A), solution; (B), fine slimes are obtained.

*Product (A).*—This solution contains (in certain ores), iron, aluminium, chromium, and uranium compounds, together with compounds of the acid earths and rare earths. Sodium carbonate (avoiding excess), is added to this solution, and all the above-mentioned elements are precipitated as insoluble compounds. These are removed by means of a vacuum filter and the clear liquid rejected. The precipitate recovered on the filter is boiled with an excess of a solution of sodium carbonate which causes the uranium to pass into solution. It is then recovered as sodium uranate by the addition of sulfuric acid, or caustic soda. The balance of the precipitate which still contains, in addition to compounds of iron and aluminium, "acid earths" and "rare earths," is treated with moderately dilute sulfuric acid, which dissolves said precipitate with the exception of the "acid earths." These latter are filtered off, washed and ignited. The sulfuric acid filtrate which will now contain the "rare earths," is treated with oxalic acid, which precipitates them as oxalates. These oxalates are then washed, dried, and ignited. The above operations complete the treatment of products (A) from the settlers.

*Product (B)*.—The fine slimes contain most of the radium and are treated on the usual lines, and the crude radium and barium sulfates obtained in the ordinary way.

The improved process herein described, is, so far as I am aware, applicable to all radium bearing ores; if any exist for which it is not suitable, they are not at present known to me. It is particularly applicable to complex radium ores which resist the usual preliminary solvent treatment with sulfuric acid, but in all cases the cost of treatment is considerably reduced.

Having now fully described and ascertained my said invention and the manner in which it is to be performed, I declare that what I claim is:—

1. An improved process for treating complex radium ores consisting in fusing the crushed ore with acid sodium sulfate, adding thereto a re-agent, capable of bringing about a powerful decomposing, oxidizing action, cooling and crushing the mass and agitating with water, siphoning off the turbid liquid into settlers, and treating the suspended and dissolved matter for the recovery of radium and other valuable constituents substantially as set forth.

2. In a process for treating complex radium ores, fusing the crushed ore with acid sodium sulfate and adding to the fused mass a re-agent capable of bringing about a powerful decomposing and oxidizing action.

3. In a process for treating complex radium ores, fusing the crushed ore with acid sodium sulfate and adding thereto chlorid of sodium, as and for the purpose specified.

4. The process of treating complex radium ores consisting in fusing crushed ore with acid sodium sulfate in the presence of sodium chlorid, cooling, pulverizing and agitating the pulverized mass with water, separating the turbid liquid from the coarse residues, settling the turbid liquid to obtain solution and fine slimes, and treating said solution and fine slimes separately for the recovery of their valuable constituents.

In testimony whereof I have hereunto set my hand in presence of two subscribing witnesses.

SIDNEY RADCLIFF.

Witnesses:
EDWARD WATERS,
WILLIAM HERBERT WATERS.